July 11, 1967            J. C. GRANT            3,329,987

SIDE-OPENING PIPE WIPER

Filed Aug. 24, 1964            5 Sheets-Sheet 1

INVENTOR.
JOHN C. GRANT
BY
ATTORNEY

July 11, 1967   J. C. GRANT   3,329,987
SIDE-OPENING PIPE WIPER

Filed Aug. 24, 1964   5 Sheets-Sheet 5

INVENTOR.
JOHN C. GRANT
BY *C. G. Stallings*
ATTORNEY

500
United States Patent Office 3,329,987
Patented July 11, 1967

3,329,987
SIDE-OPENING PIPE WIPER
John C. Grant, Huntington Park, Calif., assignor to Byron Jackson Incorporated, Long Beach, Calif., a corporation of Delaware
Filed Aug. 24, 1964, Ser. No. 391,639
9 Claims. (Cl. 15—210)

This invention relates to improvements in pipe wipers and the like. The invention is primarily directed to improvements in side opening disc-type wipers intended for stripping well liquids, such as mud or oil, from generally cylindrically shaped objects moved longitudinally, such as from a cable, string of pipe, and/or well tools being withdrawn from an oil well or the like as the string is drawn through the wiper at the well head, in the usual manner.

In the drilling and servicing of a well, such as an oil well, it is frequently necessary to remove from the bore hole tools and strings of pipe or combinations thereof and as these are withdrawn from the bore hole, they are usually found to be coated with oil, drilling mud, or with other contaminants from the well. It is undesirable to have these contaminants remain on the pipe and tools as they tend to spread over the floor of the drilling platform and create hazardous working conditions. Further, such contaminants, if not removed from the pipe or tools, make them slippery and hard to handle with consequent trouble and danger to the drilling crew or operator. Further, the fluids should be removed from any pipe or tools before they are stored as they may damage or corrode the tools or pipe.

As shown, for example, by Patent No. 2,966,690 it has long been the practice to insert a wiper below the rotary table used by the driller, whereby the pipe and tools are stripped of their liquids at the well head and the liquids are either channeled back into the bore hole or are conducted away from the area by any suitable conduit means.

Further, wipers in common use comprise a disc of elastomeric or flexible materials reinforced around its outer margin or periphery. When a single disc is used, it is usually provided with a center opening and fitted over the pipe from the top as the first section of the pipe is withdrawn from the well, which means that the string must always be disassembled to remove or replace such a wiper during the pipe pulling operation. Side opening wipers have been known and have been fitted around the pipe but these have had to be bolted together, or constructed of expensive difficult-to-mold arrangements, or both, in which either difficulty in mounting is present or the wiper is unduly costly. Many times special tools are needed for assembling the wipers and such tools may be inadvertently dropped into the well bore or the nuts, bolts, or other assembling means may be so dropped, with consequent damage and inconvenience.

Applicant has developed an improved wiper disc which eliminates many objections applicable to previous wipers, and which disc may comprise one-half of a wiper assembly and may be readily combined with another disc similar or identical in construction, to provide such a wiper assembly which will wipe the entire circumference of a pipe or the like being pulled through the wiper assembly.

It is a further object to provide such a construction in which the disc elements may be manufactured on the same mold and assembled in back-to-back surface-contacting relationship, and in which each such disc has integrally provided attaching means for cooperation with the attaching means of the other disc to hold the structure in assembled, semi-rigid relation.

Further in this connection, it is an object to provide a wiper in which each disc may be independently mounted on the pipe means and assembled to a second similar disc after placing the discs on the pipe means, individually, by integral interlocking means carried by each disc. Thus it is an object to provide a compound wiper of at least two discs in which the assembly is accomplished solely by integral means forming a part of the discs.

Further, it is an object to provide an improved construction which may be assembled on a pipe string from the side, moved into position through the rotary table of a drill rig without the necessity of removing the master bushing or other well drilling or operating parts, and which, when in position, abuts up against the bottom edge of the master bushing with freedom to move laterally with the lateral movements of the pipe on which it is mounted.

It is a further object of the present invention to provide a disc which is reinforced adjacent its outer margin, and which in assembled relation cooperates with the reinforcing means of the companion disc to give a strong improved structure.

A feature and object of the present invention is the provision of apertures positioned to match up with similar apertures when the discs are assembled in back-to-back relation whereby any entrapped material, such as liquids between the discs, will drain therefrom. Also any such material or liquid on top of the assembled discs will drain therethrough. Further, the apertures provide windows through which the operator may see the space below the discs.

It is the object of the present invention to provide an arrangement for which no tools are needed to assemble the wiper discs in place and into interlocking relationship, and in which no ancillary bolts or other attaching means are required. This eliminates the possibility of dropping such bolts, nuts, tools or other bits of metal into the well, with consequent possible damage thereto.

Other objects and advantages of the invention will be hereinafter described or will be apparent to those skilled in the art, and the novel features of the invention will be defined in the appended claims.

Referring more in detail to the construction shown in the drawings and referring first primarily to the embodiment disclosed in FIGURES 1, 2, 3, 4, 5, and 6, there is provided a disc of reinforced elastomeric or flexible material, here shown as generally oval shaped. This disc, designated generally as disc A, is narrower through its minor axis than the major axis in order to enable the operator to insert the disc, after it is placed on the well pipe, through the opening in the master bushing of a rotary table, whereby the disc will nest below the master bushing and be drawn up against the bottom thereof by the pipe movement, where it is retained in position and prevented from being pulled back through the master bushing by the end areas contacting the bottom of the master bushing. This procedure is well-known in the art. The disc may, however, be round, rectangular, or other desired shape, without departing from the improvements shown herein.

Figure 1:
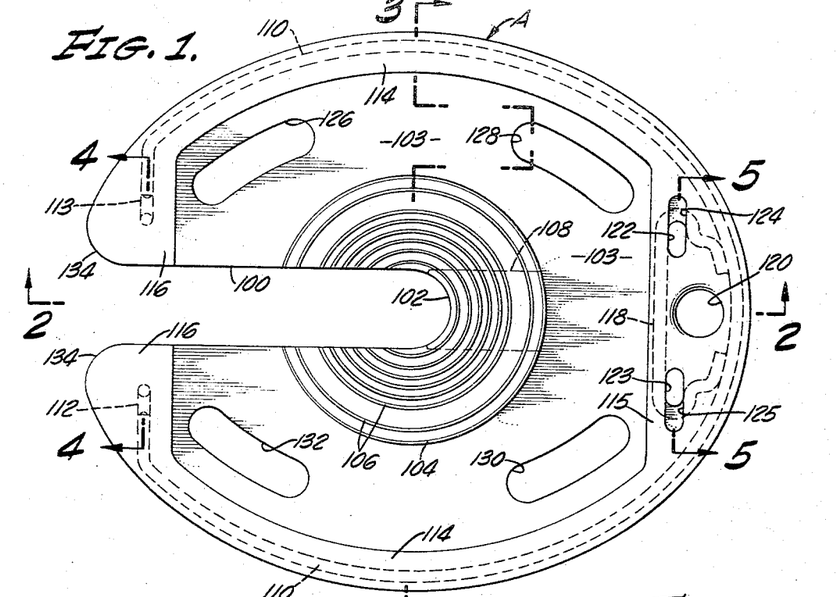
FIG. 1 is a plan view showing one form of disc comprising my invention.

Disc A has a pipe-receiving opening or cleft, there shown in the form of a slot 100 from its outer margin on the major axis to the center area where it terminates in an arcuate portion comprising at least a major portion, that is, an arc of more than 180°, of a pipe hole 102 (described hereinafter) to receive and engage a pipe abutting against the sides and terminal end of said slot.

Figure 2:
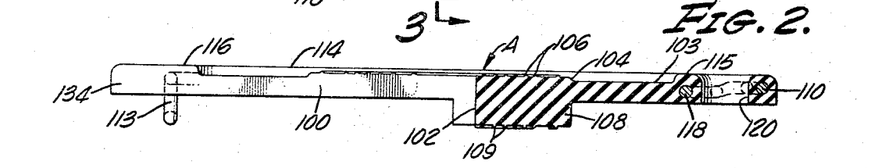
FIG. 2 is an elevational view taken on the line 2—2 of FIG. 1, and looking in the direction of the arrows, the view being partially in cross-section.

As will be noted particularly in FIGURES 1 and 2, the area around the terminal portion of said slot is thickened and extends upwardly above the surrounding intermediate portions 103 of the disc, to form a circular or arcuate boss as shown at 104, on the upper surface of the disc, and boss 104 is preferably provided with a series of concentric ridges 106. Such a boss with ridges has been known heretofore as shown, for example in Patent No. 2,966,690, and serves the well known purposes of strengthening the center portion of the wiper disc and constituting a marking gauge for enabling the operator to cut away and remove sections necessary to obtain the correct size pipe hole for the string of pipes, tools, or other objects to be pulled through the wiper.

Figure 3:
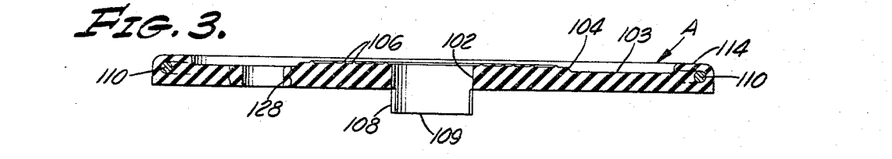
FIG. 3 is an elevational view taken on the line 3—3 of FIG. 1, and looking in the direction of the arrows, the view being partially in cross-section.

As will be apparent from a dotted line portion of FIGURE 1 and from FIGURES 2 and 3, there is provided in the center area, a downwardly depending portion, here-in termed plug 108 to emphasize one of its functions, which is located diametrically opposite the cleft or slot 100 and depends downward approximately the same distance from the bottom plane of the surrounding intermediate portion of the disc as the distance from the bottom plane of the disc surrounding the plug 108 to the plane of the top of the center boss 104. This plug may be merely a thickened depending portion of the material of the disc, but is separately described to emphasize one of its unique purposes. It is noted that plug 108 extends in length approximately from the margin of the hole 102 radially outwardly along the major axis to the outer margin of the raised center portion 104. The width of this plug is substantially the width of the cleft or slot 100, and its purpose, as will be noted later, is to fit into a similar slot on a companion or mating disc when two discs are assembled to form a compound wiper, thus forming with the mating disc a pipe engaging hole 102 in the central portion of the assembly. Plug 108 is also provided with arcuate concentric ridges 109 on its bottom surface.

The disc A is provided with, and has molded thereinto, a strengthening element around the outer margin thereof, and here shown as comprising a preformed bar in the form of a split ring 110, the ends of which are spaced apart and extend to the area adjacent each side of the slot 100, and equally spaced therefrom. Here again marginal strengthening elements, as such, are not new and as shown in the above-mentioned patent, have heretofore been disclosed in the art and used in production of wipers. This split ring 110 is preferably preformed in the shape shown, and has sufficient spring to allow its free end portions to be urged apart or toward each other a short distance without the ring 110 taking a set or becoming permanently deformed.

Figure 4:
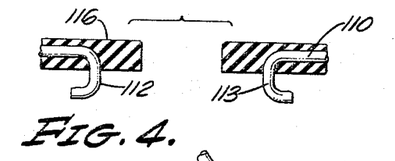
FIG. 4 is a fragmentary cross-sectional view taken on the line 4—4 of FIG. 1, and looking in the direction of the arrows.

A feature that is novel in this disclosure is that the split ring, as illustrated in FIGURES 1, 2, 3, and 4, has its ends deformed downwardly and bent into hook shape to provide the hooks 112 and 113, as illustrated particularly in FIGURES 2 and 4. The hooks 112 and 113 depend below the bottom plane or back of the elastomeric material of disc A, and are a part of or integral with the split ring which, except for said hook portions, is molded into and integral with the body of disc A in the outer marginal portion thereof.

The disc A is provided with a raised or thickened marginal portion or edge 114 on its upper surface, and the end areas or ends of the oval have this thickened portion extending inward a substantial distance as shown at 115 and 116. This thickened edge 114 and the end portions 115 and 116 add materially to the strength of the disc and assist in preventing distortion when the disc is in use. Further, the thickened portions provide a more adequate retention means or "bed" for the split ring 110.

Figure 6:
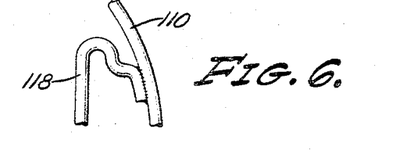
FIG. 6 is a fragmentary plan view of the hook retainer and split ring, indicating the preferred construction thereof.

Referring to FIGURES 1, 2, and 6 in particular, there is provided a hook retainer 118 which, in the construction shown, is welded to or formed integrally with the ring 110. This hook retainer 118 is preferably offset or deflected slightly downwardly from the plane of the ring 110, as will be evident from the dotted line construction of FIGURE 2. The purpose of this will be readily apparent, but the top surface of the hook retainer is preferably located in its widest extremities, a distance below the surface of the thickened end 115 approximately the diameter of the ring 110, whereby when the hooks, similar to hooks 112 and 113 of the mating disc, are retained therein (as will later be described), they will be flush at their top margins with the top surface of the thickened end 115.

Preferably, in the thickened end portion 115, there is provided a hook-receiving hole 120 whereby the disc A may be engaged by a hook or other tool to assist the operator to position the disc or to tilt and remove it from below a rotary table when desiring to service the disc or for other reasons. This procedure is well-known in the art and therefore not illustrated in the drawings herein.

Figure 5:
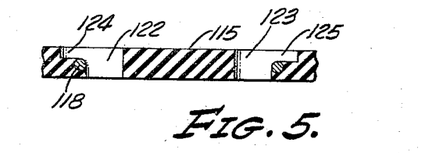
FIG. 5 is a fragmentary cross-sectional view taken on the line 5—5 of FIG. 1, and looking in the direction of the arrows.

Eyelets 122 and 123 are formed in the end 115, these eyelets being positioned within the hook retainer 118 in the manner indicated in FIGURES 1 and 5, in particular. Preferably eyelets 122 and 123 are countersunk as clearly apparent from FIGURE 5 at 124 and 125 to a depth from the top of the end 115 to the top of the hook retainer 118, at least the countersunk portion overlying the hook retainer 118 being elongated or oval in shape to receive the ends of mating hooks of another disc.

The intermediate area 103 is the portion of the disc A between the thickened edge 114 and its ends 115 and 116, on the one hand, and the raised center boss 104, on the other. Preferably the material in the intermediate area 113 is flexible in order to allow the material around the center boss 104 to be flexed or distorted in respect to the marginal areas when the disc is pushed through the rotary table after the disc is mounted on a pipe or the like, somewhat as shown, for example in FIGURE 1 of the U.S. Patent 2,958,088.

The intermediate area 103 is provided with ports or apertures, herein sometimes termed windows 126, 128, 130 and 132. These windows are preferably spaced so that when a similar disc is placed back-to-back with disc A, and the ends of the backing are reversed 180 degrees, the windows of the two discs will register. These windows, as will be noted later, form drain means for contaminants being removed from the pipe and which may get on top of or between the discs forming a disc assembly as hereinafter disclosed.

It will be noted from FIGURE 1 that the cleft end 116 of the disc is preferably provided with a notch-like portion at the area adjacent the outer end of the cleft or slot 100, as shown at 134 to form a wider entrance portion to the cleft to assist the operator to more easily place the disc on a pipe or the like.

Having reference particularly to FIGURES 7, 8, 9, and 10, I have shown the device heretofore described as disc A, assembled in back-to-back "bearing" relationship and interlocked with another identical or similar disc. In this connection it is contemplated that the two discs could be made in the same mold whereby the need for additional equipment to make the second disc would be eliminated.

In normal use of discs such as disc A for wiping a string of pipe or an oil well or the like, it would be desirable, or necessary in order to obtain a complete 360° wiping action on the pipe, to use two discs each comprising one-half of a wiper assembly. Further two discs would be desirable because of added strength and rigidity. In order to clearly indicate the relationship of the parts, the overlying disc as shown in FIGURES 7, 8, 9 and 10 will be referred to as disc A as has previously been described, and the bottom disc will be referred to as disc B to distinguish it from disc A although it is identical in construction with disc A but merely inverted and with the ends reversed, that is with the cleft or slot positioned 180° from the cleft of disc A.

Referring now to the arrangement shown in FIGURES 7, 8, 9, and 10, I have here shown two discs of the construction above described with respect to disc A in assembled back-to-back relation, thereby providing a compound wiper or assembly. The numerals used in describing disc B will be the same for the same parts and features as those of disc A above, except for the addition of the letter "$b$" after the numerals.

As clearly apparent from FIGURES 7, 8, 9, and 10, the two discs are assembled in a back-to-back bearing relationship, which assembly normally takes place after the respective discs are placed on the pipe or the like (not shown) so that the pipe extends vertically through the pipe hole 102–102$b$. Ordinarily the pipe hole 102–102$b$ would be slightly smaller in diameter than the pipe to be wiped in order that it would have a scraping or very tight wiping action.

Figure 7:
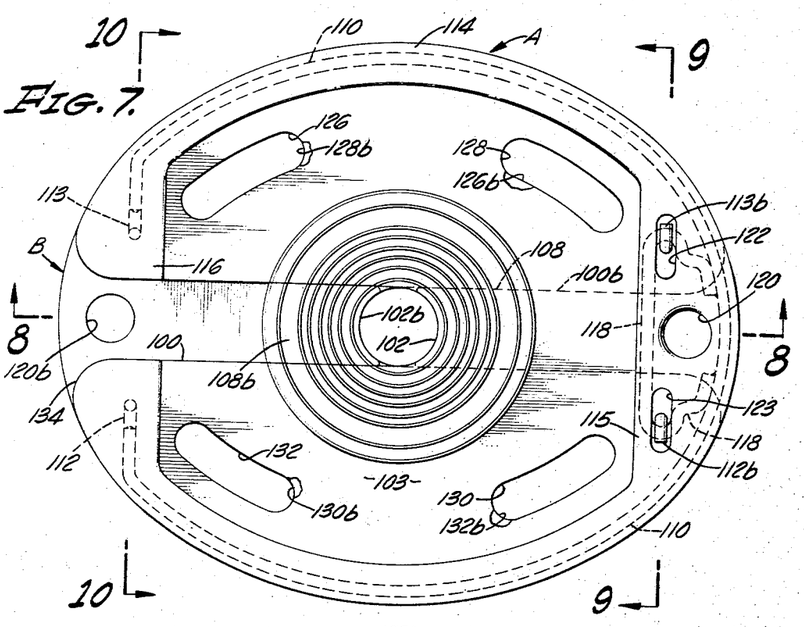
FIG. 7 is a plan view of the assembly of two wiper discs of the construction shown in FIG. 1, in back-to-back relation.

In practice, disc A would be forced onto a pipe by placing the open end of the cleft 100 against the pipe and forcing the disc in a direction towards the open end of the cleft, to the left as shown in FIGURE 7.

Disc B would ordinarily be inverted and placed on the opposite side of the pipe and forced in a direction to the right as shown in FIGURE 7 so that when the two discs are fully on the pipe they would entirely surround the pipe and it would be extending vertically with respect to the plane of the discs and through the pipe hole 102–102$b$.

Figure 8:
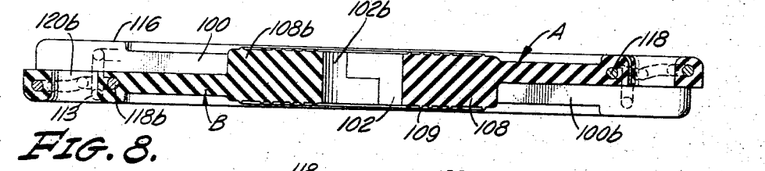
FIG. 8 is a side elevational view, partially in cross-section, taken on the line 8—8 of FIG. 7, and looking in the direction of the arrows.
Figure 9:
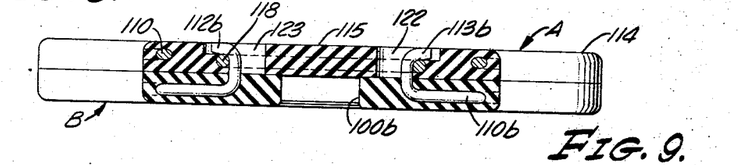
FIG. 9 is an elevational view, partially cross-section, taken on the line 9—9 of FIG. 7, and looking in the direction of the arrows.

It will be clearly apparent from FIGURE 8, when disc A and disc B are coupled together to form a wiper assembly, the plug 108 of disc A fits into the slot 100$b$ of disc B, and the plug 108$b$ of disc B fits into the slot 100 of disc A. This arrangement would complete a 360° wiper surface engaging the pipe at the position of the pipe hole 102–102$b$. The plug 108 would normally prevent the sides of the cleft 100$b$ of disc B from being forced together, which might dislodge the hooks of disc B. Similarly, plug 108$b$ would support the sides of disc A.

After placing the two discs on the pipe, the hooks of each disc are inserted in the eyelets of the other disc whereby they engage or nest against the hook retainer of the other disc. Thus the hooks 113$b$ and 112$b$ would extend upwardly through the eyelets 122 and 123, respectively, and would be firmly nested against and over the hook retainer 118, and be retained therein with their most upwardly extending portion flush with the top of the thickened end of disc A and extending laterally away from the cleft 100. This would form a seat from which said hooks could not normally be dislodged and would hold the discs together in assembled relation at the end portion described.

Correspondingly, the other end of the assembly, the hooks 112 and 113, depending downwardly from disc A, would be similarly received in the eyelets 123$b$ and 122$b$, respectively, of disc B. Here they would nest under the hook retainer 118$b$ flush with the surface of disc B.

As noted above, the ends of these hooks are normally deformed backwardly upon themselves or laterally away from the cleft, whereby in order to be dislodged, the disc end portions on each side of the cleft would have to be forced toward the cleft or slot 100, or 100$b$ as the case may be to thereby allow disconnection of the hooks from the eyelets.

It will thus be seen that the wiper assembly is well reinforced and that any forces tending to dislodge and separate the assembly would not be normal forces that act on the wiper. In the first place because of pipe movement the disc A would normally ride upward against the bottom surface of a master bushing of a rotary table, whereby the reinforced portions of the disc are supported against distortion. Disc B in turn is urged against the bottom of disc A by the same movement of the pipe passing through disc B. Should an enlarged portion of the string such as a collar or pipe protector move through the wiper, the slots surrounding the pipe will distort to allow the passage of any such normal item, but the force on the slot will tend to tighten the engagement of the hooks with the respective hook retainer so that they are not likely to be accidentally displaced from the holding position.

It will further be noted that each of the apertures or windows of one disc register with an aperture of the other disc, so that any contaminant on top of the disc or getting between the two discs may drop there-through and prevent any build-up sufficient to separate the discs A and B. Thus, in the arrangement shown in FIGURE 7, aperture 126 of disc A would register with aperture 128$b$ of disc B; aperture 128 with aperture 126$b$; aperture 130 with aperture 132$b$ and aperture 132 with aperture 130$b$.

Figure 11:
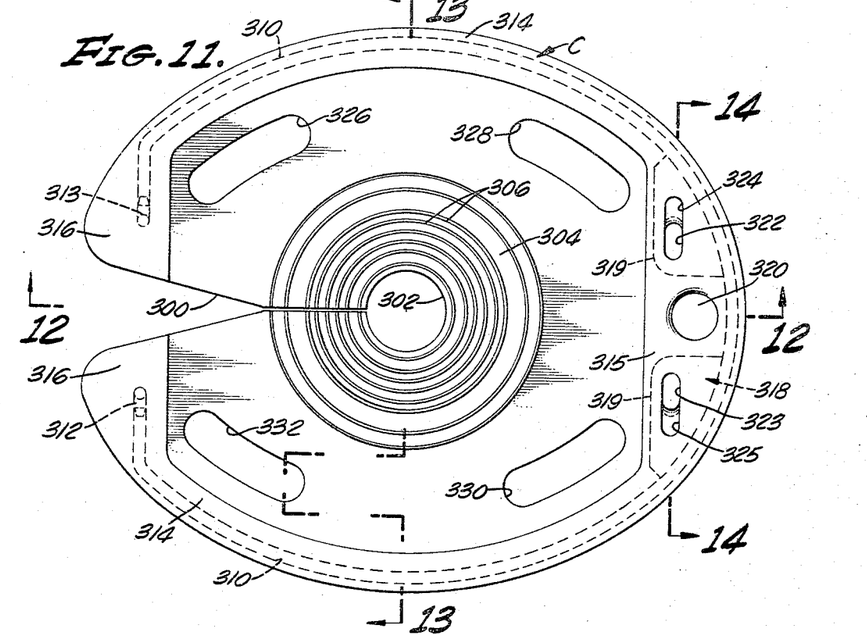
FIG. 11 is a plan view showing a modified form of wiper disc.

Referring to the modified arrangement shown in FIGURES 11, 12, 13, 14 and 15, it is noted that many of the features of this construction are similar to or identical with the arrangements shown in FIGURES 1 through 10. As shown in FIGURE 11, the wiper disc is here designated as disc C. It is provided with a cleft designated broadly as cleft 300, in the form throughout much of its length of a radially extending slit, terminating in the center portion of the disc C in the pipe hole 302. With the exception of the very narrow break formed by the slit for cleft 300, the pipe hole 302 has its marginal edges extending entirely around the pipe opening whereby a pipe or string of tools passing therethrough would be wiped substantially entirely around the circumference thereof.

The disc C, in its central portion, is provided with a circular raised or thickened portion herein referred to as the center boss 304. This boss 304 is similar to the boss 104 in the structure shown in FIGURE 1 except that it extends arcuately a greater distance due to the difference in the form of the cleft of disc C as compared with the cleft of disc A. However, the purpose of the boss or raised portion is the same as that described in connection with disc A and will not be further described here. It may be noted, however, that the boss 304 is likewise provided with concentric ridges here numbered 306, the same as concentric ridges 104 shown and described in disc A.

Further, in the arrangement shown in FIGURE 11, there has been no plug (such as plug 108 of disc A) provided on the bottom thereof since it is not necessary due to the narrow width of the cleft 300. Thus the disc has a relatively smooth bottom surface.

Figure 12:
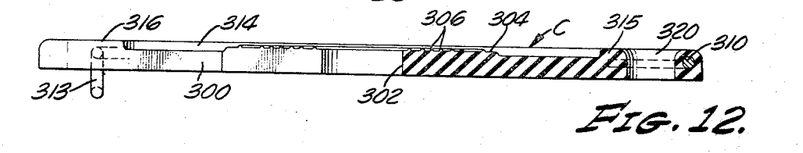
FIG. 12 is an elevational view, partially in cross-section, taken on the line 12—12 of FIG. 11, and looking in the direction of the arrows.
Figure 13:
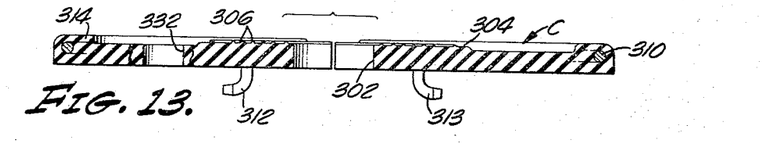
FIG. 13 is an elevational view, partially in cross section, taken on the line 13—13 of FIG. 11, and looking in the direction of the arrows.
Figure 14:
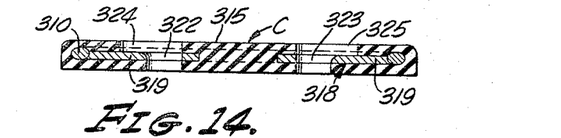
FIG. 14 is an elevational view in cross-section, taken on the line 14—14 of FIG. 11, and looking in the direction of the arrows.

There is provided a reinforcing ring here shown as the split ring 310, preferably preformed in a shape to be molded in the material of the disc and thus become integral therewith, the ring being positioned around and reinforcing the marginal edges of the disc C. As was the case with the split ring 110 of disc A, the terminal ends of the split ring are deformed downwardly, as shown in FIGURE 12 and FIGURE 13, and bent back in a direction away from the cleft 300, thereby forming the hooks 312 and 313. Since the split 310, hook 312 and hook 313 are substantially identical with the arrangement described in the above description of disc A, it is not believed necessary to further describe the arrangement or operation of these elements at this time.

It will be noted that disc C is provided with the thickened marginal edge 314 and with thickened end portions 315 and 316, in the same manner as disc A was provided with such structure.

Figure 15:
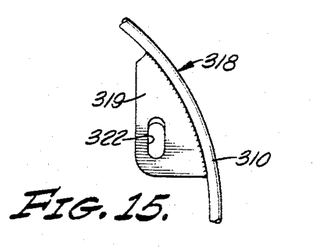
FIG. 15 is a plan view of another arrangement of hook retainer and fragment of the split reinforcing ring.

While the hook retainer 118 of disc A would work equally well with disc C, for illustrative purposes I have shown a modified form of hook retainer for disc C. This hook retainer, best evident from FIGURE 11 and FIGURE 15, is here designated in its entirety as the hook retainer 318. It comprises a tab 319 welded or otherwise attached to the split ring 310, in the arrangement best shown in FIGURE 11. As here shown, the retainer in its entirety comprises a plurality of tabs 319, one located on either side of the center line of the disc C in its longitudinal axis, the hook retainer 318 having the eyelets 322 and 323. Thus the hook retainer, as an integral part of the split ring 310, would be molded into the disc C. As will be evident from FIGURES 11 and 14 in particular, the disc material above the eyelets 322 and 323 has been removed so that the eyelets are countersunk as shown at 324 and 325, respectively.

Disc C is provided with apertures 326, 328, 330, and 332, for the purpose, among others, of draining any contaminant, when such contaminant falls on the top of the disc or is introduced between two discs in a wiper assembly.

Disc C also has a hook-receiving hole 320 corresponding to the hole 120 of disc A, and for the same purposes.

Referring next to the wiper assembly shown in FIGURES 16, 17, 18, and 19, the arrangement here is generally similar to that described in connection with discs A and B. However, due to the elimination of the plug 108 which is not used on disc C, the arrangement is somewhat simpler. To prevent confusion, I have designated the top disc in FIGURE 16 as disc C, and the bottom disc in the assembly as disc D. Disc D can be identical in construction with disc C, and is preferably so constructed. The small letter "d" added to the numerals of disc D describing the elements when they are the same as disc C, will help to distinguish the various parts and features of the assembly.

Figure 16:
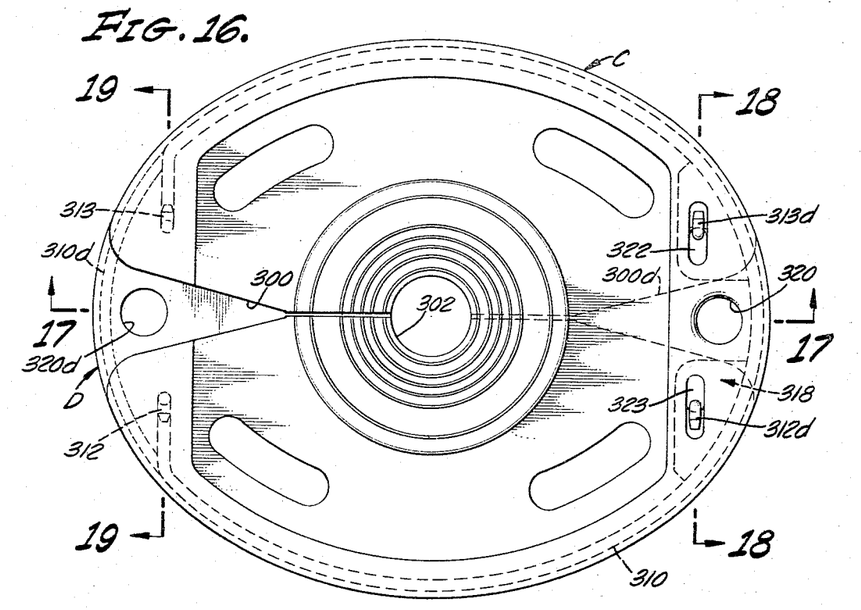
FIG. 16 is a plan view of an assembly incorporating the modified form of wiper disc shown in FIG. 11.

As is obvious from the above, the wiper assembly of FIGURES 16, 17, 18 and 19 comprises the disc C and the disc D in back-to-back surface engaging relationship. The cleft 300 as illustrated in FIGURE 16 is at the left, and the cleft 300d is at the right.

Figure 17:
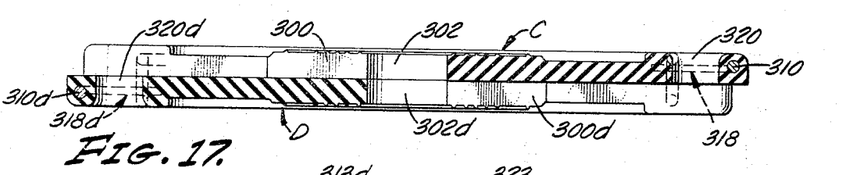
FIG. 17 is an elevational view of the disc assembly of FIG. 16, partially in cross-section, taken on line 17—17 of FIG. 16, and looking in the direction of the arrows.
Figure 18:
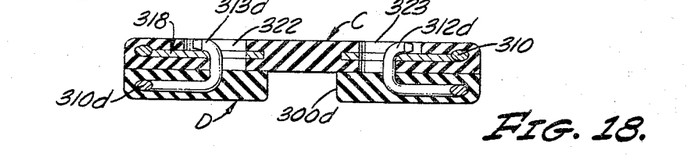
FIG. 18 is an elevational cross-sectional view taken on the line 18—18 on FIG. 16, and looking in the direction of the arrows.

As will be noted from both FIGURES 16 and 17, the hook 312d fits into and is held in the eyelet 323, and the hook 313d fits into and is held in the eyelet 322. These hooks seat against and are held in place by the hook retainer 318.

Figure 19:
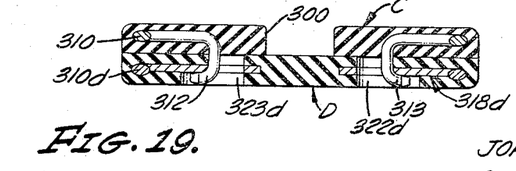
FIG. 19 is an elevational, partially cross-sectional, view taken on the line 19—19 of FIG. 16, and looking in the direction of the arrows.

As will be noted from FIGURE 19, the hook 312 seats in the eyelet 323d and the hook 313 seats in the eyelet 322d. These hooks are held in place by the tabs 318d.

Referring to FIGURE 17 in particular, it will be noted that in normal use the pipe being wiped will extend through the pipe holes 302d and 302, and that despite the slit form of cleft 300, the entire circumference of the pipe will be wiped by the combined disc assembly.

Figure 20:
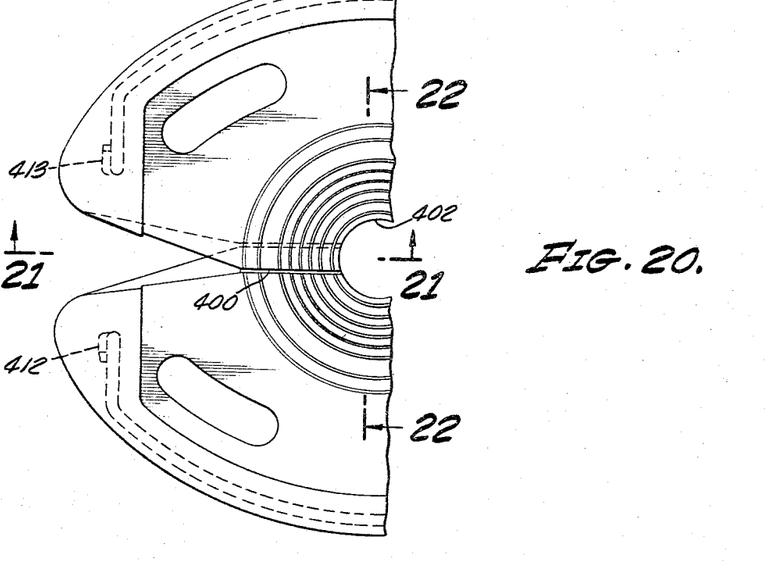
FIG. 20 is a fragmentary plan view illustrating a further modified form of the device forming the present invention.
Figure 21:
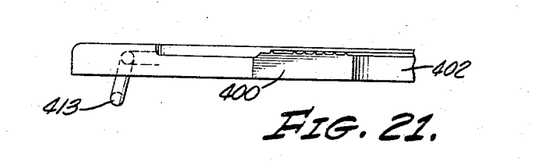
FIG. 21 is a side elevational view taken on the line 21—21 on FIG. 20, looking in the direction of the arrows.
Figure 22:
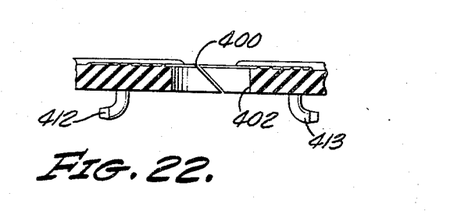
FIG. 22 is a fragmentary elevational view, partly in cross section, and taken on the line 22—22 of FIGURE 20, looking in the direction of the arrows.

Referring next to the construction shown in FIGURES 20, 21 and 22, these figures represent a disc similar to the disc C shown in FIGURE 11, with two differences. As will be clear from FIGURES 20 and 22, the slit or cleft 400 corresponding to cleft 300 of FIGURE 11 is made at an angle from the vertical in order that the material on one side thereof overlaps the material of the other side and thus gives a 360 degree wiping action in the pipe hole 402. In actual practice this slit is preferably some 30° from the vertical although any suitable angle may be used.

It is noted that any distortion caused by the passage of the pipe or a joint thereof through the pipe hole 402 would tend to spread the edges of the slit, but that the overlapping material would still normally result in a complete 360° wiping action.

In this connection, the disc of FIGURE 20 could be used alone and obtain a complete wiping action although it would not have the strength and advantages of using an assembly of two discs in back-to-back relation as previously described in connection with other discs herein disclosed, and as intended for the normal use of this modification.

A further modification, apparent from FIGURE 20 and FIGURE 21, is the slant from the vertical (here shown as some 5° but which may be any desired angle) given to the hook means 412 and 413. This has two advantages over the hook previously disclosed, the first being that it assists in the assembly in that after the two discs are placed on the pipe in the manner previously described, one of the discs may be tilted to engage the hook and thereby assist in the initial engagement. The second advantage, and probably the greater one, is that the angle given to the hook is in an outward direction that will cause it to better resist dislodgement and hold tighter in event of deformation of the material due to the passage of an enlargement through the pipe hole 402.

The arrangement of the hook means shown in FIGURE 20 and in FIGURE 21, is equally applicable to the disc of FIGURE 1 and of FIGURE 11. Further, the angular slit as shown in FIGURE 20 for the cleft means 400, is equally applicable to the cleft of FIGURE 11. Also as noted above, the hook retainer of FIGURE 15 is interchangeable with the hook retainer of FIGURE 6 in all of the structures disclosed.

While I have herein shown and described certain embodiments of my invention, alterations and changes may be made without departing from the spirit of the invention as defined in the appended claims.

I claim:

1. A wiper assembly comprising two discs assembled in back-to-back relationship, each disc having a pipe hole therethrough positioned to register with the pipe hole of the other disc, and hook means and hook receiving means integral with each disc releasably securing said disc to the other disc, each of said discs including a flexible split ring, the terminal ends of said ring comprising said hook means, the latter being disposed to engage said hook receiving means when said discs are in back-to-back relationship.

2. A wiper assembly comprising two substantially identical discs of material in back-to-back surface engaging relationship, said discs in combination having means forming a pipe hole having a 360° circumference, each disc containing a cleft extending from the pipe hole to the outer margin of the disc, and each disc having hook means and hook receiving means integral therewith releasably securing it to the other disc, the cleft of one disc being positioned in said assembly diametrically opposite the cleft of the other disc, each of said discs including a flexible split ring, the terminal ends of said ring comprising said hook means, the latter being disposed to receive said hook receiving means when said discs are in back-to-back relationship.

3. A wiper assembly comprising two substantially identical oval discs of flexible material arranged in back-to-back surface engaging relationship, cleft means in each of said discs extending from the outer margin thereof and terminating in a pipe receiving means in the central portion of said disc, said discs having their respective cleft means on the major axis of said assembly in diametrically opposite positions, plug means on each disc extending into the cleft means of the other disc when the discs are in assembled relation and substantially identical means on both discs comprising integral attaching means constituting the sole means holding said discs in assembled relation.

4. A wiper assembly comprising two substantially identical oval discs of elastomeric material in back-to-back surface engaging relationship, each of said discs being adapted for lateral installation on and removal from a drill pipe and each of said discs having reinforced marginal areas and center area with flexible intermediate area therebetween, those improvements comprising:
 a notched cleft extending from the outer margin to the center area of each disc, the cleft of one disc in said assembly being positioned at substantially 180° from the cleft of the other disc;
 split ring reinforcing means imbedded in the material of each disc, the ends of said split ring in each disc terminating laterally of the cleft thereof and extending in a vertical direction from the bottom of the material of the disc, said ends being formed into retaining hooks adapted to engage the other disc in the assembly;
 hook receiving means in each disc adapted to be engaged by the hook means of the other disc; and
 hook retainer means positioned to reinforce the hook receiving means and to be engaged by the hook means of the other disc when said discs are in back-to-back surface engaging relation in the assembly, said hook receiving means and hook retainer means comprising the sole fastening means holding the disc in assembled relationship, said attaching means being readily releasable.

5. In a wiper assembly comprising two substantially identical oval discs of elastomeric material, those improvements comprising:
 discs in back-to-back surface engaging relationship;
 cleft means in each of said discs adapted for the mounting and removal of the disc from a pipe by lateral movement of said discs, said cleft means being on the major axis of each of said discs and extending from approximately the center of said discs to the outer margin thereof;
 a pipe hole in the center area of said disc, at the terminal end of said cleft means;

the cleft of one disc in said assembly being substantially 180° from the cleft of the other disc;
 and a split ring reinforcing means imbedded in the material of each said disc, the ends of said split ring in each disc terminating laterally of the cleft of said disc;
 hook means integral with the split ring, and
 hook receiving and retaining means in each disc, said hook means of each disc being adapted to be received and retained in the hook receiving and retaining means of the other disc whereby the said discs are fastened in back-to-back surface engaging relationship.

6. As an article of manufacture, a wiper disc of flexible material, such as rubber or the like, adapted for installation on and removal from a drill pipe string;
 a cleft comprising a slot extending from the central portion of said disc to the outer marginal edge thereof;
 a plug beginning at said central portion and extending diametrically opposite said cleft;
 a split ring imbedded in the material of said disc and extending around the marginal portion thereof, said split ring having ends each terminating laterally of said cleft in a hook portion depending downwardly below the plane of the bottom surface of said disc; and
 hook receiving and retaining means integral with said disc adapted to receive and retain hook means of a similar disc, said hook means and hook receiving and retaining means comprising the sole means for attaching said disc to another disc of similar construction.

7. An article of manufacture, comprising an oval wiper disc of flexible material, such as rubber or the like, adapted for lateral installation on and removal from a drill pipe string, said disc having a major axis and a minor axis;
 a thickened center portion of said disc comprising a boss generally concentric with the center of said disc;
 a cleft extending along the major axis from the central portion of said boss to the outer margin of said disc;
 a thickened reinforcing portion on the outer end margin of said disc on each side of said cleft;
 a second thickened reinforcing portion on the major axis at the end of said disc opposite the first-mentioned thickened reinforcing end portion;
 a raised marginal reinforcing portion on the remaining marginal area of said disc and merging into said above-mentioned end thickened portions;
 the intermediate area of said disc between all of said thickened portions and said center boss being thinner and therefore more flexible;
 window means in said intermediate portion of said disc;
 a split ring imbedded in the material of said disc extending around the marginal portion of said disc, said split ring terminating on each side of said cleft and having its ends bent downwardly and slanted at an acute angle toward the end of the cleft and formed into hooks extending below the bottom surface of said disc;
 a hook retainer imbedded in said disc in said second end thickened portion;
 and hook receiving eyelets through the said disc and within the hook retainer.

8. As an article of manufacture, a wiper disc of flexible material, such as rubber or the like, adapted for lateral installation on or removal from a drill pipe string, a pipehole in said disc, a cleft comprising a slit at an acute angle to the plane of the disc and extending from the pipehole to the margin of said disc, and means integral with said disc adapted to attach said disc to a similar disc, said means integral with said wiper disc including a flexible split ring, the terminal ends of said ring comprising hook means, and hook receiving means, said hook means being disposed to engage a similar hook receiving means on said similar disc and said hook receiving means being disposed to be engaged by similar hook means on said similar disc when said wiper disc is in back-to-back relationship with said similar disc, said means integral with said disc comprising in cooperation with similar means on said similar disc the sole attaching means.

9. As an article of manufacture, an oval wiper disc of flexible material, such as rubber or the like, adapted for lateral installation on and removal from a drill pipe string, said disc having a major axis and a minor axis;

- a thickened center portion of said disc comprising a boss generally concentric with the center of said disc;
- a cleft extending along the major axis from the central position of said boss to the outer margin of said disc;
- a thickened reinforcing portion on the outer end margin of said disc on each side of said cleft;
- a second thickened reinforcing portion on the major axis at the end of said disc opposite the first-mentioned thickened reinforcing end portion;
- a raised marginal reinforcing portion of said disc on the remaining marginal areas of said disc merging into said above-mentioned end thickened portions;
- the intermediate area of said disc between all of said thickened portions and said center boss being thinner and therefore more flexible;
- window means in said intermediate portion of said disc;
- a split ring imbedded in the material of said disc and extending around the marginal portion of said disc; said split ring terminating on each side of said cleft and having its ends bent downwardly and formed into hooks extending below the bottom surface of said disc;
- a hook retainer integral with the split ring and imbedded in said disc in said second end thickened portion;
- and hook receiving eyelets through the said disc and within the perimeter of the hook retainer.

References Cited

UNITED STATES PATENTS

| | | | |
|---|---|---|---|
| 2,910,332 | 10/1959 | Madsen | 277—197 |
| 2,928,114 | 3/1960 | Ballard | 15—210.2 |
| 2,966,690 | 1/1961 | Taylor | 15—210.2 |
| 3,055,036 | 9/1962 | Minor | 15—210.2 |

CHARLES A. WILMUTH, *Primary Examiner.*

L. G. MACHLIN, *Assistant Examiner.*

UNITED STATES PATENT OFFICE
CERTIFICATE OF CORRECTION

Patent No. 3,329,987            July 11, 1967

John C. Grant

It is hereby certified that error appears in the above numbered patent requiring correction and that the said Letters Patent should read as corrected below.

Figure 10:
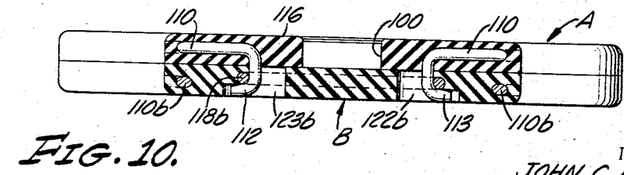
FIG. 10 is a side elevational view, partially in cross-section, taken on the line 10—10 of FIG. 7 and looking in the direction of the arrows.

In the drawings, Sheet 2, Fig. 10, for "112" read -- 113 --; for "123b" read -- 122b --; for "122b" read -- 123b --; for "113" read -- 112 --; column 5, line 15, for "113" read -- 103 --; column 6, line 63, for "register" read -- registers --; column 7, line 36, after "split" insert -- ring --.

Signed and sealed this 25th day of June 1968.

(SEAL)
Attest:

Edward M. Fletcher, Jr.

Attesting Officer

EDWARD J. BRENNER

Commissioner of Patents